Figure 1:
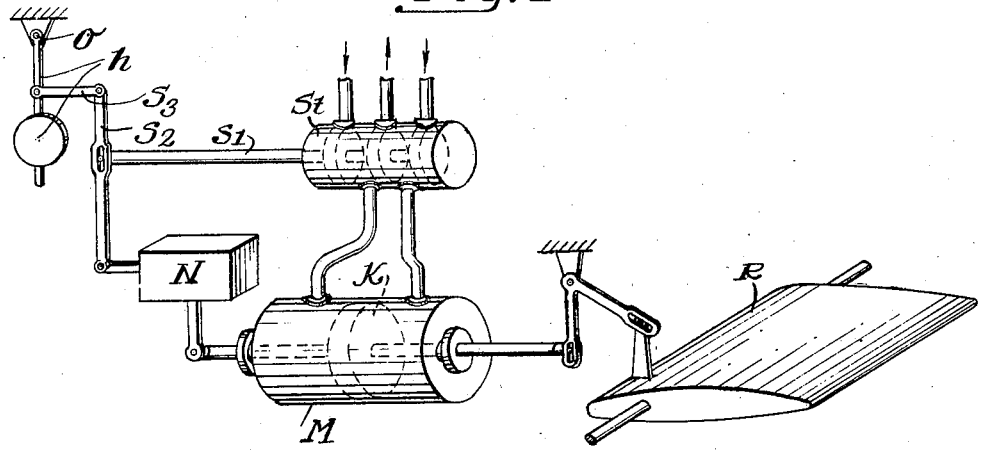

Feb. 2, 1937.  E. FISCHEL  2,069,605
CONTROL ARRANGEMENT FOR MOTORS, PARTICULARLY RUDDER MOTORS
Filed Sept. 7, 1933  2 Sheets-Sheet 1

INVENTOR
EDUARD FISCHEL
BY
ATTORNEYS.

Feb. 2, 1937. E. FISCHEL 2,069,605
CONTROL ARRANGEMENT FOR MOTORS, PARTICULARLY RUDDER MOTORS
Filed Sept. 7, 1933 2 Sheets-Sheet 2

Inventor:
Eduard Fischel.
By
Attorneys.

Patented Feb. 2, 1937

2,069,605

UNITED STATES PATENT OFFICE 2,069,605

CONTROL ARRANGEMENT FOR MOTORS, PARTICULARLY RUDDER MOTORS

Eduard Fischel, Berlin-Charlottenburg, Germany, assignor to Siemens & Halske, Aktiengesellschaft, Siemensstadt, near Berlin, Germany, a corporation of Germany Application September 7, 1933, Serial No. 688,536
In Germany January 4, 1933

3 Claims. (Cl. 121—41)

The invention relates to restoring means in control arrangements for motors which are to transmit a definite theoretical movement in the form of a control magnitude, for example, the course deviation of an air or water craft, to an object, for example, to the vertical rudder of the craft. When using direct regulation a restoring movement of the regulating member provided for the motor is necessary in accordance with the movement carried out by the motor, in the manner that the displacement of the regulating member from the mean position is proportional to the difference between the theoretical movement and the movement carried out by the motor. It is already known to devise this restoring movement not completely rigid, but resilient. Liquid brakes, for example, oil cataracts, have been used as resilient transmission members in such cases, the resilient part of which cooperates with a spring or a similarly acting device which at large control movements somewhat protracts the return and again restores the zero position of the resilient intermediary member. In the formerly known control devices the flow channels of the liquid brake are always open, so that at each restoring movement of the regulating member by the motor, there also results a more or less large displacement of the liquid brake which has the consequence of a retarded restoration of the regulating member and thereby a longer period during which the motor is in circuit. This sensitive resiliency of the restoring movement in the zero position is undesirable, since it very easily gives rise to inaccuracies and fluctuations of the adjustment.

It is desirable that the restoring movement should only be resilient temporarily, and that only at large and rapid displacement movements of the motor, but should otherwise be completely rigid.

In order to achieve this object, according to the invention the flow opening of the above mentioned liquid brake, provided with a reverse position, is arranged to be automatically closable within a determined displacement range embracing the zero position of the resilient part of the liquid brake. When employing a hydraulic brake cylinder, this can be achieved in a simple manner, in that the piston of the brake cylinder provided with a flow opening is itself displaceable on a fixed piston rod, the piston of which shuts off, in the neighbourhood of the zero position of the piston of the liquid brake, the overflow channel between the two chambers of the hydraulic brake cylinder.

Figure 2:
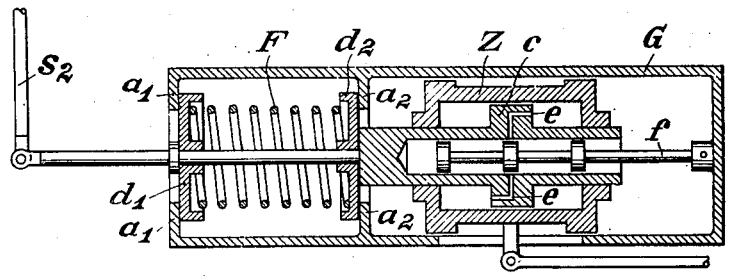
Figure 3:
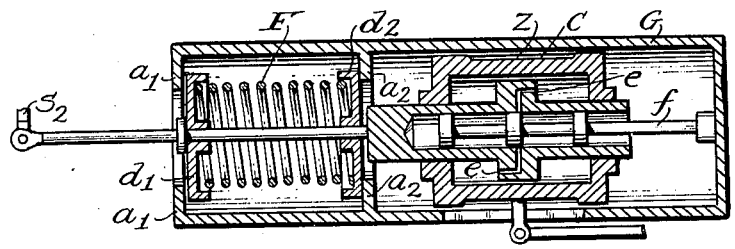
Figure 4:
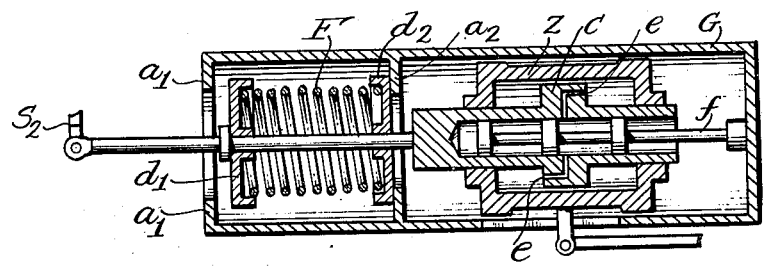
Figure 5:
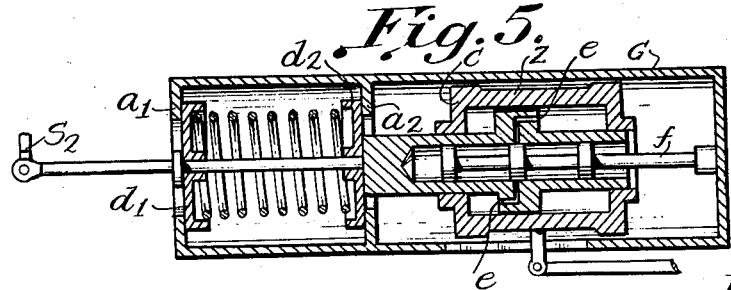

A constructional example of the invention is illustrated diagrammatically in the drawings, in which Fig. 1 is a diagrammatic view of the apparatus, Fig. 2 is a detail sectional view of a resilient intermediate member included therein, and Figs. 3, 4, and 5 are corresponding sectional views showing the parts in different positions.

In Fig. 1, R is, for example, the horizontal rudder of an aircraft which is controlled by the cylinder motor M connected to the hydraulic control valve $st$. The piston rod $s_1$ of the control valve is operated in accordance with the control value by means of the lever arms $s_2$ and $s_3$ from the lever $h$ rotating about the fixed pivot $o$. The movement of the motor piston $k$ effected thereby in the one or the other direction is transmitted on the one hand to the rudder R and backwardly over the yieldable intermediary member N and the rods $s_2$ and $s_1$ to the control valve, until the rudder R has assumed a deviation corresponding to the position of the lever $h$ and thereby the control valve $st$ is again closed.

Figure 2 shows the yieldable intermediary member N in enlarged section. The piston rod of the motor M is connected to the hydraulic cylinder Z movable in the casing G. The piston $c$ of this cylinder is represented in the figure in its zero position, in which it is held by the spring F, which is disposed, under tension, between two discs $d_1$ and $d_2$ displaceably guided on the piston rod and the edges of which abut against the projections $a_1$ and $a_2$ of the casing G. The two liquid chambers of the cylinder Z are connected by the channel $e$ which, however, in the zero position of the piston $c$ (as shown), is closed by the central piston of a piston rod $f$ secured to the casing G. It is evident that so long as the control movement of the lever $h$ and therefore also the adjusting movement of the motor M is only small, then also the restoring movement, that is to say, the displacement of the cylinder Z within the casing G, is only very small, so that the connecting channel $e$ is not opened by the piston $f$. In this case the restoring movement is completely rigid. As soon however, as larger deviations of the control lever $h$ are transmitted to the rudder, then the displacement of the cylinder Z is so large that the connecting channel $e$ is opened and thereby the restoring movement becomes resilient.

The essential features of the instant invention are to be found in the isostatic member N which is shown in detail in Figs. 2, 3, 4, and 5 of the drawings, and in its combination with the other elements of the arrangement shown by way of example in Fig. 1. The construction and operation of the member N is such that in its zero position it is rigid. The result is accomplished by the intermediate piston of the piston valve f in co-operation with the channel e which, as shown in Fig. 2, is of a particular form. In former constructions a horizontal channel extended straight through a piston and was continuously open, an arrangement which results in inaccurate and inefficient regulation.

If it is assumed in Fig. 1 of the drawings that h is a vertical pendulum which responds to the longitudinal rocking or tilting of an air craft and R the elevating rudder thereof, then it is intended according to the invention that with small pendulum oscillations of the air craft about its transverse axis, resulting from squalls or the like, the deviations of R are to be proportional to those of h. When however, in the interior of the air craft a load (passenger) shifts from front to rear, that is a single weight shifting takes place, then the resulting slight disturbance of the condition of equilibrium are to be counteracted only through corresponding adjustments of the elevating rudder R, for instance to about the position illustrated. In such case the connection between the pendulum h and the rudder R must not be rigid for the reason that after compensation for the aforesaid weight shifting the pendulum h returns to its normal, vertical position, while the rudder R must remain at a predetermined angle from its normal position.

The motion corresponding to this angle of the rudder must be accumulated in the arrangement shown in Fig. 2, which is possible, because the piston c is capable of shifting in the cylinder Z. As long as the rudder deviations are only of short duration, the channel e will not be opened, even if the spring F is compressed to a degree corresponding to the rudder deviation. When however the deviations of the rudder are of long duration, the spring F will press against the piston c continuously for a correspondingly longer time, so that, because of leakage, (a restricted flow of fluid lengthwise of the walls of the cylinder Z is constantly possible) the channels e will finally be opened; as stated, a definite time period is necessary for this to be effected. In other words, deviations of the rudder R of short duration, such as result for instance from squalls, do not bring about an opening of the channels e, but if the rudder R remains in a deviated position, no matter how slight such deviation may be, for a long period, an operating force is developed in the spring F which finally results in an opening of the channels e; as soon as this occurs, the piston c suddenly shifts in the cylinder Z to that position in which the spring F is no longer under tension. The zero position between the rudder R and the pendulum h is thus shifted to an extent corresponding to the degree of shifting of the cylinder Z relatively to that of the piston c in its restored zero position.

The result is that during rocking of the air craft relatively to its position of equilibrium due to squalls and the like, the yielding member N does not effect a shortening or lengthening of the connection, so that the rudder deviations are exactly proportional to the deviations of the member h. This is a very important feature as it insures a quick accurate counter operation against periodic rocking of the craft. In addition, however, when a prolonged period of one-sided unsymmetry, resulting for instance from uneven loading develops, the possibility of shifting the zero position between the member h and the rudder R, which is necessary in the control of the rudder, is present. Such an unsymmetrical condition is required in the course control of the craft, when for instance in a plural motored machine, the left or right hand motor ceases to operate so that the propelling force is applied unsymmetrically.

Because of a squall the aircraft may be so affected that the pendulum h deviates relatively to the air craft in a clockwise direction. As a result of this control valve st is shifted to open the connections between the motor M and the source of hydraulic power in a predetermined manner. The piston k of the motor M is shifted until the control valve st is restored to its original position by means of the elements N, $S_2$, $S_1$. Hereupon the individual parts of the yielding member N assume approximately the relative positions shown in Fig. 3, in which the channels e are still closed by the central piston of the piston rod f which is connected with the casing G. Because of this no relative shifting of the piston c and cylinder Z takes place; in other words these two elements act as if they were rigidly connected with each other.

In view of the foregoing operations the rudder R is displaced and the aircraft returns to the desired position relatively to the transverse axis, and thereby the pendulum h again takes the position relatively to the aircraft shown in Fig. 1. As a result of this the motor M is again switched in, but in an opposite sense, until again the several elements occupy the positions shown in Figs. 1 and 2. If in the meantime, the squall, which initiated the control operations, has ended, then the control operations apart from possible oscillations will cease.

It is now assumed that for instance a passenger or some other weight is shifted during a flight in the direction of the longitudinal axis of the aircraft, and that because of this the aircraft may be tilted to considerable degree. As a result the pendulum h is deviated relatively to the aircraft to a much greater extent than in the first instance described above. The motor M is accordingly again switched in and its piston k is shifted until the control valve st is again restored to the zero position by the elements N, $S_2$, $S_1$. Hereupon the individual elements of the yielding member N assume the relative positions illustrated in Fig. 4. The channel e is accordingly opened centrally, and the piston c is shifted relatively to the cylinder Z, by the action of the spring F. As a result the motor M is thereby successively switched into operation.

Finally after continued oscillations the elements of the member N assume the relative positions shown in Fig. 5, while at the same time the pendulum h, the control valve st, the lever arms $s_3$ and $s_2$ and the piston rod $s_1$ take the positions illustrated in Fig. 1. This means therefore, that the air craft has again assumed the proper position relatively to its transverse axis, while however at the same time the elevating rudder R remains in an adjusted position deviating to a specific degree from its position in Fig. 1. This degree of deviation serves to compensate for the above mentioned shifting of weight so that the aircraft assumes and retains its proper position relatively to its transverse axis.

With respect to the previously mentioned leakage it is to be understood that the piston c as such, is arranged to fit the cylinder Z with a sliding fit; obviously, however, a certain amount of leakage past the piston is unavoidable and practically a certain clearance therefore exists between the piston c and the cylinder Z. This clearance is, however, so small that the flow of fluid lengthwise of the walls of the cylinder Z, or in other words the leakage which passes through said clearance from one side of the piston c to the other side thereof is small in relation to the amount of fluid which flows through the channels e insofar as the same are opened. The aforesaid clearance is negligible in relation to the cross-section of the channels e, or at least is to be regarded as small with respect thereto.

From the above it will be seen that the internal construction and operation of the member N is such that the latter is capable, in effect, of varying its length, and that the valve f serves, in co-operation with the channel e, as a locking device to control said variations in length.

Having now particularly described and ascertained the nature of my said invention and in what manner the same is to be performed, I declare that what I claim is:

1. The combination of a control member, a motor, a control device for said motor, connections from said control member to said control device and said motor, a fluid cylinder, a hollow piston movable therein, said cylinder and piston being located in the connection between said control member and said motor, a channel in said piston open to said cylinder on opposite sides of said piston, a relatively stationary piston valve extending into said hollow piston for controlling said channel whereby said piston and cylinder are fixed against relative movement and permitted to move relatively to each other, and a spring bearing against said hollow piston and tending to maintain the same in its zero position and to return it thereto.

2. In a device of the kind described, the combination of a fluid cylinder, a piston movable therein, a channel in said piston open to said cylinder on opposite sides of said piston, said piston being further formed with an axial bore intersecting said channel, a relatively stationary piston valve projecting into said axial bore and controlling said channel, a casing containing said cylinder, piston and piston valve, and a spring in said casing bearing against said piston for maintaining the latter in zero position and for returning it thereto.

3. A servo-motor mechanism comprising a power motor, a power supply for said motor, control means in said power supply, a controlling member in operative connection with said control means, an operative connection between said motor and said control means, an isostatic member located in said last mentioned operative connection, said isostatic member including a casing, a cylinder slidable in said casing and connected with said power motor, a piston slidable in said cylinder and connected with said controlling member, and locking means in said isostatic member dependent upon the operative movements of said motor and adapted to lock said cylinder and piston against movement relatively to each other and to release said cylinder and piston for movement relatively to each other to enable said isostatic member to vary its length only when the motor develops operative movements exceeding a predetermined extent.

EDUARD FISCHEL.